US012560678B2

(12) United States Patent
Ma

(10) Patent No.: US 12,560,678 B2
(45) Date of Patent: Feb. 24, 2026

(54) MILLIMETER-WAVE RADAR AND AUTOMOBILE DRIVING CONTROL SYSTEM

(71) Applicant: Autel Intelligent Technology Corp., Ltd., Shenzhen (CN)

(72) Inventor: Yanwen Ma, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 343 days.

(21) Appl. No.: 18/555,867

(22) PCT Filed: Apr. 11, 2022

(86) PCT No.: PCT/CN2022/086070
§ 371 (c)(1),
(2) Date: Oct. 18, 2023

(87) PCT Pub. No.: WO2022/222781
PCT Pub. Date: Oct. 27, 2022

(65) Prior Publication Data
US 2024/0201321 A1      Jun. 20, 2024

(30) Foreign Application Priority Data
Apr. 20, 2021      (CN) .......................... 202110423419.8

(51) Int. Cl.
*G01S 7/02*            (2006.01)
*B60R 16/023*        (2006.01)
(Continued)

(52) U.S. Cl.
CPC .......... *G01S 7/027* (2021.05); *B60R 16/0231* (2013.01); *G01S 13/867* (2013.01); *G01S 13/931* (2013.01)

(58) Field of Classification Search
None
See application file for complete search history.

(56) References Cited

U.S. PATENT DOCUMENTS 7,126,525 B2 * 10/2006 Suzuki .................. G01S 13/931
                                                           342/175
7,450,071 B1 * 11/2008 Volman .................... H01Q 1/42
                                                           343/846
(Continued)

FOREIGN PATENT DOCUMENTS

CN         205940608 U      2/2017
CN         209390184 U      9/2019
(Continued)

OTHER PUBLICATIONS

International Search Report of PCT Patent Application No. PCT/CN2022/086070 issued on Jun. 28, 2022.
(Continued)

*Primary Examiner* — Bernarr E Gregory
(74) *Attorney, Agent, or Firm* — Andrew C. Cheng

(57) ABSTRACT

The millimeter-wave radar includes a radome, an antenna board, a metal middle frame, a main control board and a base which are sequentially arranged. An image acquisition module is provided on one side of the main control board facing the radome. The antenna board is provided with a radar transceiver control module and is electrically connected to the main control board. The metal middle frame is provided with a notch through which the image acquisition module passes. The radome is made of a material through which radar waves emitted by the antenna board can pass; the radome is connected to the base; the main control board, the antenna board and the metal middle frame are located in a space enclosed by the radome and the base; and the radome is provided with a through-hole which communicates with (Continued)

the notch so that the image acquisition module extends outside of the through-hole.

10 Claims, 5 Drawing Sheets

(51) Int. Cl.
G01S 13/86 (2006.01)
G01S 13/931 (2020.01)

(56) References Cited

U.S. PATENT DOCUMENTS

| | | | | |
|---|---|---|---|---|
| 2007/0159380 | A1* | 7/2007 | Nagaishi | G01S 13/931 |
| | | | | 257/E25.031 |
| 2012/0092499 | A1 | 4/2012 | Klar | |
| 2013/0181859 | A1* | 7/2013 | Waldschmidt | H01Q 1/42 |
| | | | | 342/70 |
| 2015/0349414 | A1 | 12/2015 | Tagi | |
| 2019/0377061 | A1 | 12/2019 | Kobayashi | |
| 2021/0286047 | A1* | 9/2021 | Schulte | G01S 13/931 |

FOREIGN PATENT DOCUMENTS

| | | | |
|---|---|---|---|
| CN | 209624765 U | 11/2019 | |
| CN | 110676594 A | 1/2020 | |
| CN | 111142077 A | 5/2020 | |
| CN | 211642043 U | 10/2020 | |
| CN | 113093192 A | 7/2021 | |
| CN | 215180877 U | 12/2021 | |

OTHER PUBLICATIONS

Search Report of CN Patent Application No. 202110423419.8 issued on Jun. 29, 2024.
First office action of CN Patent Application No. 202110423419.8 issued on Jun. 29, 2024.

* cited by examiner

MILLIMETER-WAVE RADAR AND AUTOMOBILE DRIVING CONTROL SYSTEM

CROSS-REFERENCE TO RELATED APPLICATIONS

The present application is the National Stage application for PCT patent application Serial No. PCT/CN2022/086070, filed on Apr. 11, 2022, which claims priority to Chinese Patent Application No. 202110423419.8, entitled "Millimeter-Wave Radar and Automobile Driving Control System", filed on Apr. 20, 2021, by China Patent Office, which is incorporated herein by reference in its entirety.

TECHNICAL FIELD

Embodiments of the present invention relate to the technical field of radar technology, in particular to a millimeter-wave radar and automobile driving control system.

BACKGROUND OF THE INVENTION

With the continuous update and iteration of artificial intelligence technology, more and more products tend to develop towards intelligence, networking, and unmanned technologies, such as in an aspect of intelligent driving, it is necessary to arrange a millimeter-wave radar and other equipment to detect and identify the environment around the automobile to provide data basis for the control of obstacle avoidance and running speed of the automobile.

At present, an angle detected by the millimeter-wave radar of the automobile is small, and it is impossible to achieve a wide range of angle detection in a front-rear direction on a side of the automobile.

SUMMARY OF THE INVENTION

In view of the above problems, embodiments of the present invention provide a millimeter-wave radar and an automobile driving control system to achieve a large-angle detection range and improve the recognition accuracy of a detected object.

According to an aspect of an embodiment of the present invention, a millimeter-wave radar is provided, which includes: a radome, an antenna board, a metal middle frame, a main control board and a base which are sequentially arranged, wherein an image acquisition module is provided on one side of the main control board facing the radome; the antenna board is provided with a radar transceiver control module and is electrically connected to the main control board; the metal middle frame is provided with a notch through which the image acquisition module passes; the radome is made of a material through which millimeter-waves can pass, the radome is connected to the base, and the main control board, the antenna board and the metal middle frame are all located in a space enclosed by the radome and the base, and the radome is provided with a through-hole which communicates with the notch, so that the image acquisition module extends outside the through-hole.

In an alternative, the radar transceiver control module is provided on a face of the antenna board facing away from the metal middle frame, and a face of the metal middle frame facing the antenna board is provided with a first thermally-conductive pad at a position corresponding to the radar transceiver control module.

In an alternative, an outer cover of the radar transceiver control module is provided with a shield for preventing electromagnetic interference between the antenna on the antenna board and the radar transceiver control module.

In an alternative, a second thermally-conductive pad is provided between the shield and the radar transceiver control module.

In an alternative, a face of the base plate facing the main control board is provided with a third thermally-conductive pad at a position corresponding to the image acquisition module.

In an alternative, the metal middle frame is further provided with a plug hole, the antenna board is provided with a first connector at a position corresponding to the plug hole, the main control board is provided with a second connector at a position corresponding to the plug hole, and at least one of the first connector and the second connector is plug-fitted with the other through the plug hole to electrically connect the main control board with the antenna board.

In an alternative, a first flange is provided around a side of the metal middle frame facing the antenna board, and a second flange is provided around a side of the metal middle frame facing the main control board;

an edge of the antenna board abuts the first flange and an edge of the main control board abuts the second flange when the first and second connectors are plug-fitted.

In an alternative, a sealing ring is provided where the radome and the base are coupled.

In an alternative, the radome comprises a first wall and a second wall provided around the periphery of the first wall, the first wall and the second wall are enclosed to form an accommodating cavity, the through-hole is provided on the first wall and communicates with the accommodating cavity, and the main control board, the antenna board and the metal middle frame are all located in the accommodating cavity; a support protrusion is provided on a face of the base facing the main control board, a face of the main control board facing away from the metal middle frame abuts against the support protrusion, the radome is sleeved outside the support protrusion, and the sealing ring is located between an outer peripheral wall of the support protrusion and an inner peripheral wall of the second wall.

According to another aspect of an embodiment of the present invention, an automobile driving control system is provided, which includes an automobile body, a control platform built in the automobile body, and the above millimeter-wave radar provided on either side of a top of the automobile body and electrically connected to the control platform.

For the millimeter-wave radar according to an embodiment of the present application, an radome, an antenna board, a metal middle frame, a main control board and a base are which are sequentially arranged, the antenna board and the main control board are isolated from each other via the metal middle frame to avoid electromagnetic interference between the antenna board and the main control board; the antenna board emits millimeter-waves that can penetrate the radome; and an image acquisition module on the main control board can detect an external environment via a through-hole of the radome, so that the millimeter-wave radar can also detect the external environment via the image acquisition module in addition to detecting the antenna. The image information acquired by the image acquisition module can be used to supplement the area where the millimeter-wave emitted by the antenna board cannot be detected. Compared with the traditional radar, this method has less interference, and the data information detected by the antenna board transmitting the millimeter-wave and the image information acquired by the main control board by the image acquisition module are fused to improve a detectable angle range of the millimeter-wave radar and the detection accuracy of the detector.

The above description is merely an overview of the technical aspects of the present invention, which can be carried out in accordance with the contents of the description in order to make the technical aspects of the present invention more clearly understood, and in order to make the above and other objects, features, and advantages of the present invention more apparent, embodiments of the present invention will be described below.

BRIEF DESCRIPTION OF DRAWINGS

Various other advantages and benefits will become apparent to a person skilled in the art upon reading the following detailed description of the preferred embodiments. The drawings are only for purposes of illustrating the preferred embodiments and are not to be construed as limiting the invention. Moreover, like reference numerals designate like parts throughout the several views. In the drawings.

Figure 1:
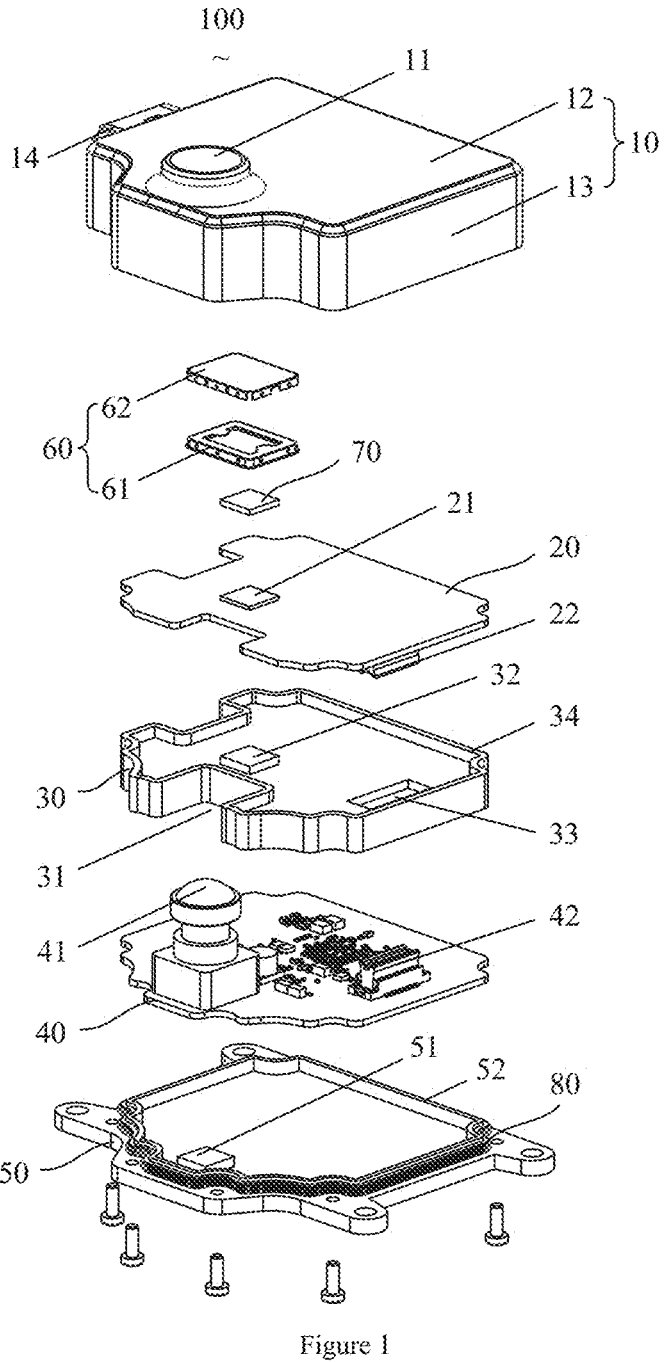
FIG. 1 shows an exploded view of a viewing angle of a millimeter-wave radar according to an embodiment of the present invention.

Reference numerals in the detailed description are as follows:

radome 10; through-hole 11; first wall 12; second wall 13; receptacle 14; antenna board 20; radar transceiver control module 21; first connector 22; metal middle frame 30; notch 31; first thermally-conductive pad 32; plug hole 33; first flange 34; second flange 35; main control board 40; image acquisition module 41; base 50; third thermally-conductive pad 51; support protrusion 52; shield 60; outer frame 61; cover plate 62; second thermally-conductive pad 70; sealing ring 80; millimeter-wave radar 100; automobile running control system 200; automobile body 210; control platform 211.

DETAILED DESCRIPTION OF THE INVENTION

Hereinafter, embodiments of the present invention will be described in detail with reference to the accompanying drawings. The following examples serve only to illustrate the technical solution of the present invention more clearly, and are therefore given by way of example only, without limiting the scope of protection of the present invention.

Figure 2:
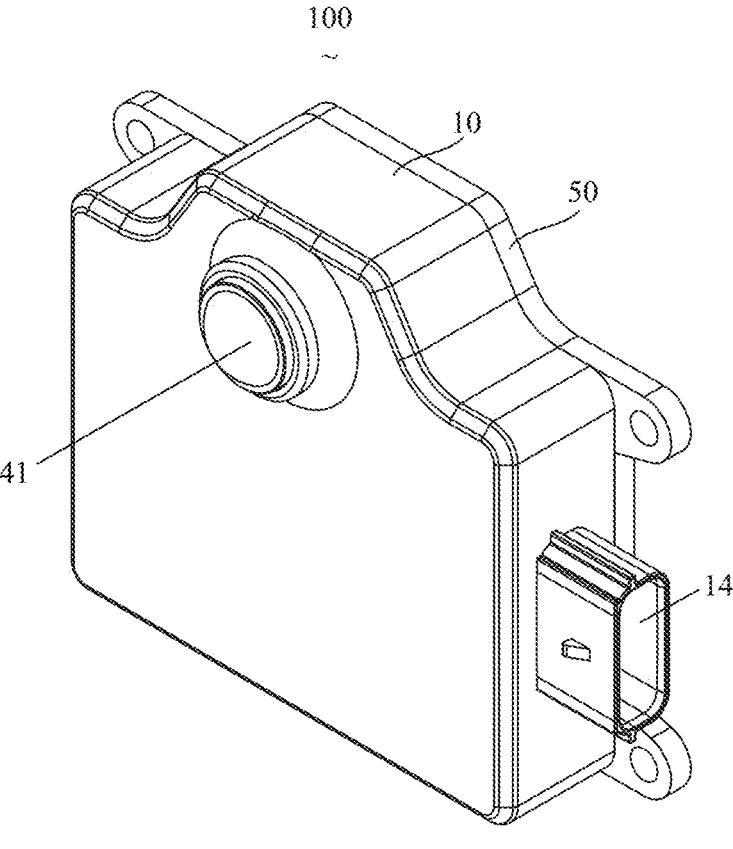
FIG. 2 shows a perspective view of a millimeter-wave radar according to an embodiment of the present invention.

Referring to FIGS. 1 to 2, FIG. 1 shows an exploded view of a perspective view of a millimeter-wave radar 100 according to an embodiment of the present invention, and FIG. 2 shows a perspective view of the millimeter-wave radar 100 according to an embodiment of the present invention. In an aspect of an embodiment of the present application, a millimeter-wave radar 100 is provided to include a radome 10, an antenna board 20, a metal middle frame 30, a main control board 40, and a base 50 which are sequentially arranged. A surface of the main control board 40 facing the radome 10 is provided with an image acquisition module 41; the antenna board 20 is provided with a radar transceiver control module 21 and is electrically connected to the main control board 40; the metal middle frame 30 is provided with a notch 31 through which the image acquisition module 41 passes; the radome 10 is made of a material through which millimeter-waves can pass; the radome 10 is connected to the base 50 and enclosed to form an accommodating space; and the antenna board 20, the metal middle frame 30 and the main control board 40 are all located in the accommodating space enclosed by the radome 10 and the base 50. The radome 10 is provided with a through-hole 11 communicating with the notch 31 so that the image acquisition module 41 extends outside the through-hole 11.

The antenna board 20 is a circuit board provided with a transceiver antenna, and the radar transceiver control module 21 is mounted on the antenna board 20, and is used for controlling the antenna on the antenna board 20 to emit millimeter-waves outwards and receive echo signals, and obtaining detection data information related to a detected object, such as the size, distance, speed, etc. of the detected object through algorithm processing, but is not limited thereto.

The radar transceiver control module 21 may be a radar sensor, such as an integrated single-chip frequency modulation continuous wave radar sensor (also referred to as a FMCW radar sensor) with a model number of awr1843, but may also be other radar control chips, which is not particularly limited here.

The main control board 40 is a circuit board provided with modules such as a processor, a power supply control unit, an image processing unit, etc.; the image acquisition module 41 is mounted on the main control board 40; the image acquisition module 41 is used for acquiring image information such as a video and a picture of an object; and the main control board 40 is used for processing the image information acquired by the image acquisition module 41 to acquire relevant information about a detected object, such as the size, distance, speed, type, etc. of the detected object, but is not limited thereto.

The antenna board 20 is electrically connected to the main control board 40, so that the main control board 40 performs fusion processing on the image information acquired by the image acquisition module 41 and the detection data information acquired by the radar transceiver control module 21 via the millimeter-wave transmitted by the antenna on the antenna board 20. When performing detection, since the direction of an image acquired by the image acquisition module 41 is the same as a detection direction of the millimeter-wave of the antenna board 20, and the coverage area of the detection angle of the image acquisition module 41 at least partially overlaps with the coverage area of the detection angle of the millimeter-wave emitted by the antenna board 20, which does not overlap with each other, the image information acquired by the image acquisition module 41 can supplement a detection blind area of the antenna board 20, thereby increasing the detectable angle range of the millimeter-wave radar 100; and in the overlapping detection area, at each moment, the detected object (such as an obstacle) can be detected by the millimeter-wave emitted by the image acquisition module 41 and the antenna board 20 at the same time, wherein the radar transceiver control module 21 can accurately acquire data information such as the distance and the speed of the detected object via the millimeter-wave emitted by the antenna of the antenna board 20, and the main control board 40 can acquire information such as the distance and the speed of the detected object via a built-in control algorithm in addition to the image acquired by the pattern acquisition module. It is also possible to determine the category of the detected object by using the acquired image information according to the built-in control algorithm, for example, determining whether the detected object is an organism such as a person or an animal, or a non-organism such as a stone or a building. By means of the described method, the millimeter-wave radar can respectively complement the advantages of different detection data information between the image acquisition module 41 and the antenna board 20, or can take a certain weight value or take a mean value according to the detection data of the same target at the same time by the two to reduce detection errors, thereby improving the detection and identification accuracy of the object.

It should be noted that the control algorithm for the radar transceiver control module 21 on the antenna board 20 to acquire the detection data information according to the millimeter-wave, and the control algorithm for the main control board 40 to acquire the detection data information acquired by the image acquisition module 41 via the image acquisition module 41, and an existing algorithm may be used as the control algorithm for information fusion.

For the millimeter-wave radar 100 according to an embodiment of the present application, an radome 10, an antenna board 20, a metal middle frame 30, a main control board 40 and a base 50 are which are sequentially arranged, the antenna board 20 and the main control board 40 are isolated from each other via the metal middle frame 30 to avoid electromagnetic interference between the antenna board 20 and the main control board 40; the antenna board 20 emits millimeter-waves that can penetrate the radome 10; and an image acquisition module 41 on the main control board 40 can detect an external environment via a through-hole 11 of the radome 10, so that the millimeter-wave radar 100 can also detect the external environment via the image acquisition module 41 in addition to detecting the antenna. The image information acquired by the image acquisition module 41 can be used to supplement the area where the millimeter-wave emitted by the antenna board 20 cannot be detected. Compared with the traditional radar 100, this method has less interference, and the data information detected by the antenna board 20 transmitting the millimeter-wave and the image information acquired by the main control board 40 by the image acquisition module 41 are fused to improve a detectable angle range of the millimeter-wave radar 100 and the detection accuracy of the detector. The main control board 40, the metal middle frame 30 and the antenna board 20 are all located in the accommodating space enclosed by the radome 10 and the base 50, so that the radome 10 and the base 50 can protect the main control board 40, the metal middle frame 30 and the antenna board 20, which is beneficial to improving the service life of the millimeter-wave radar 100, is compact and light in structure, occupies a small space, and is convenient for mounting on an automobile.

Figure 3:
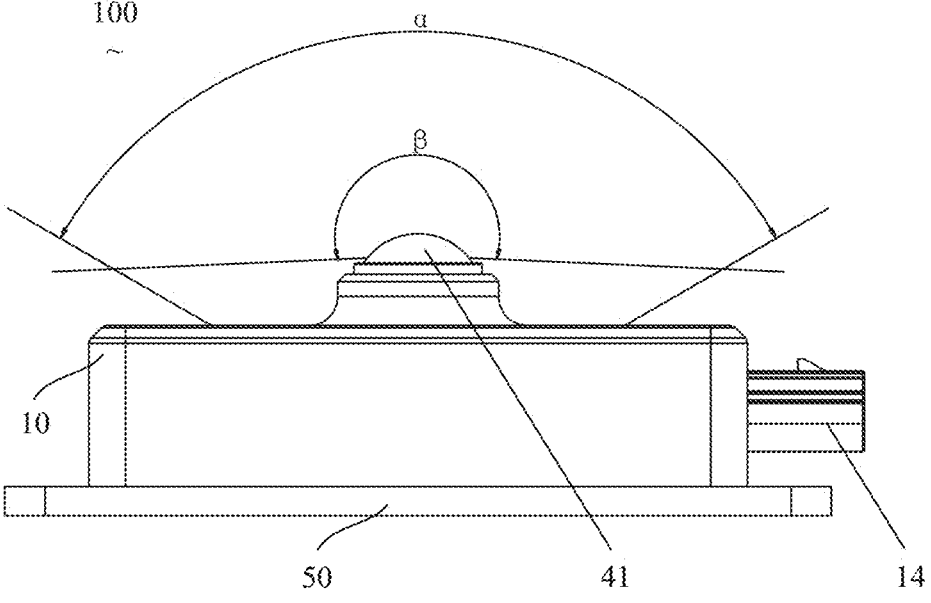
FIG. 3 shows a bottom view of a millimeter-wave radar according to an embodiment of the present invention.

Referring to FIG. 3 in conjunction with FIG. 1, FIG. 3 illustrates a bottom view of a millimeter-wave radar 100 according to an embodiment of the present invention. In some particular embodiments, the image acquisition module 41 can use a fish-eye camera, and an angle of field of view β of the fish-eye camera can reach 180 degrees or more, while an angle of field of view α which can be detected by an antenna of the existing antenna board 20 is generally about 120 degrees; therefore, through the cooperation of the image acquisition module 41 and the antenna board 20, compared with a conventional radar, the millimeter-wave radar 100 of the present application can have an angle of field of view of about 180 degrees, greatly improving the detectable angle range of the millimeter-wave radar 100.

Referring back to FIG. 1, in some embodiments, the radar transceiver control module 21 is provided on a side of the antenna board 20 facing away from the metal middle frame 30, and a side of the metal middle frame 30 facing the antenna board 20 is provided with a first thermally-conductive pad 32 at a position corresponding to the radar transceiver control module 21. The first thermally-conductive pad 32 is used for transmitting the heat transferred from the radar transceiver control module 21 to the antenna board 20 to the metal middle frame 30 via the first thermally-conductive pad 32 to reduce the temperature of the radar transceiver control module 21 and the antenna board 20, to avoid the temperature of the radar transceiver control module 21 being too high to affect the working performance, and to ensure the stability of the working performance thereof.

In some embodiments, a shield 60 is provided outside of the radar transceiver control module 21 for preventing electromagnetic interference between the antenna board 20 and the radar transceiver control module 21. Here, the shield 60 may be made of a metal material such as copper, copper alloy, iron, iron alloy, etc. but is not limited thereto.

In some embodiments, a second thermally-conductive pad 70 is further provided between the shield 60 and the radar transceiver control module 21, and the second thermally-conductive pad 70 is used for transferring the heat generated by the radar transceiver control module 21 to the shield 60 to be emitted via the shield 60, thereby further reducing the operating temperature of the radar transceiver control module 21, ensuring the stability of the operating performance thereof, and preventing the radar transceiver control module 21 from failing to operate normally due to an excessive temperature.

Specifically, the shield 60 comprises an outer frame 61 and a cover plate 62, the middle part of the outer frame 61 is provided with a hollow structure adapted to the radar transceiver control module 21, the outer frame 61 is fixedly connected to the antenna board 20, and the radar transceiver control module 21 is located in the hollow structure of the outer frame 61, so that the outer frame 61 is provided around the periphery of the radar transceiver control module 21. The cover plate 62 covers the outer frame 61 to cover and seal the radar transceiver control module 21 inside the hollow structure of the outer frame 61, wherein the second thermally-conductive pad 70 is located between the cover plate 62 and the radar transceiver control module 21, and the second thermally-conductive pad 70 respectively contacts the cover plate 62 and the radar transceiver control module 21 so that the radar transceiver control module 21, the second thermally-conductive pad 70, the cover plate 62 and the outer frame 61 form a thermally-conductive channel.

Figure 4:
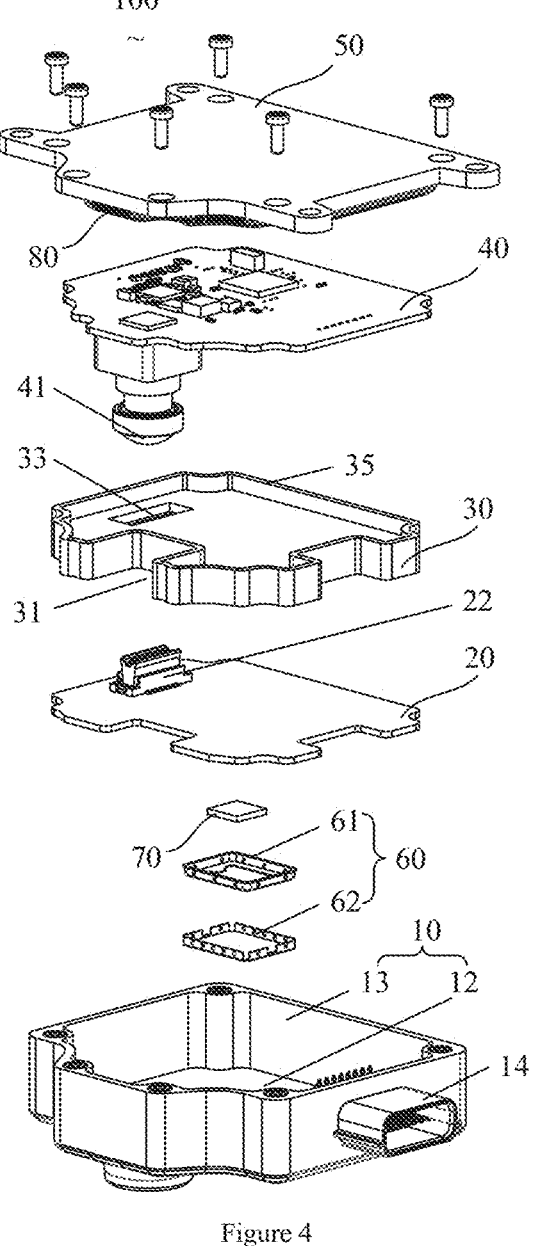
FIG. 4 shows an exploded view of another view of a millimeter-wave radar according to an embodiment of the present invention.

Referring to FIG. 4, FIG. 4 shows an exploded view of another view of a millimeter-wave radar according to an embodiment of the present invention. In some embodiments, a surface of the base 50 facing the main control board 40 is provided with a third thermally-conductive pad 51 at a position corresponding to the image acquisition module 41, and the second thermally-conductive pad 70 is used for transferring the heat generated by the image acquisition module 41 to the base 50 to dissipate the heat into the external environment via the base 50, and reducing the temperature of the image acquisition module 41 and the main control board 40 to ensure the working performance of the image acquisition module 41 and the main control board 40.

In addition, the main control board 40 generates a relatively large amount of heat at the position of the image acquisition module 41, and since the main control board 40 itself needs to process the image information acquired by the image acquisition module 41 and the data signal of the antenna board 20, and at the same time controls the coordinated work between various electrical components, such as power supply control, so that the power consumption of the main control board 40 is relatively large, in some particular embodiments, there are a plurality of third thermally-conductive pads 51 uniformly distributed on a side of the base 50 facing the main control board 40 and at least partially provided on the base 50 at a position corresponding to the image acquisition module 41, so that the temperature of the main heat-generating region where the main control board 40 is provided with the image acquisition module 41 can be transmitted to the base 50 via the third thermally-conductive pad 51, and at the same time, heat-generating regions at other positions can also be transmitted to the base 50 via the third thermally-conductive pad 51 to improve the heat dissipation effect of the main control board 40.

Specifically, in order to further improve the heat dissipation effect and reduce the temperature inside the millimeter-wave radar 100, the base 50 may be made of a material with better thermal conductivity such as a metal material, for example: a metal material such as aluminum alloy, but is not limited thereto.

With continued reference to FIGS. 1 and 2, in some embodiments, the metal middle frame 30 is further provided with a plug hole 33, the antenna board 20 is provided with a first connector 22 at a position corresponding to the plug hole 33, the main control board 40 is provided with a second connector 42 at a position corresponding to the plug hole 33, and at least one of the first and second connectors 22, 42 is plug-fitted with the other through the plug hole 33 to electrically connect the antenna board 20 with the main control board 40.

The plug hole 33 is an avoidance window provided through two end faces of the metal middle frame 30, the first connector 22 can be provided on a face of the antenna board 20 facing the metal middle frame 30, and the second connector 42 can be provided on a face of the main control board 40 facing the metal middle frame 30. The first and second connectors 22, 42 are suitable power distribution connectors. Specifically, the first and second connectors 22, 42 may be board-to-board connectors, one of which is a female connector (also referred to as a female receptacle) and the other of which is a male connector (also referred to as a male receptacle). Of course, the first and second connectors 22, 42 can also be other connectors that can be electrically connected by a plug fit.

In this embodiment, after the first connector 22 of the antenna board 20 and the second connector 42 of the main control board 40 are plug-fitted with each other through the plug hole 33, both the antenna board 20 and the main control board 40 can achieve electrical connection, and at the same time, the antenna board 20 and the main control board 40 are respectively fixed on either side of the metal middle frame 30 which faces away from each other; in this way, the structure is simple and the assembly is convenient, and the quick assembly and disassembly between the antenna board 20, the metal middle frame 30 and the main control board 40 can be achieved.

In some embodiments, a first flange 34 is provided around a side of the metal middle frame 30 facing the antenna board 20, and a second flange 35 is provided around a side of the metal middle frame 30 facing the main control board 40. When the first connector 22 is plug-fitted with the second connector 42, an edge of the antenna board 20 abuts the first flange 34 and an edge of the main control board 40 abuts the second flange 35.

By providing the first flange 34 on the peripheral edge of a face of the metal middle frame 30 facing the antenna board 20 in this embodiment, so that the first flange 34 encloses the first receiving space, a power consumption element (not shown) located in the middle area of the antenna board 20 can be located in the first receiving space, thereby preventing the power consumption element located in the middle area of the antenna board 20 from coming into rigid contact with the metal middle frame 30. Similarly, by providing a second flange 35 at the peripheral edge of the metal middle frame 30 facing the other side of the main control board 40, so that the second flange 35 encloses to form a second receiving space, a power consumption element (not shown) located in the middle area of the main control board 40 can be located in the second receiving space, thereby preventing the power consumption element of the main control board 40 located in the middle area from coming into rigid contact with the metal middle frame 30.

Here, the plug hole 33 may be provided on a middle region of the metal middle frame 30 and communicate the first receiving space and the second receiving space. Meanwhile, the ground wire of the main control board 40 may be electrically connected to the second flange 35 of the metal middle frame 30 to reduce static electricity inside the millimeter-wave radar 100, and the power consumption elements on the antenna board 20 and the main control board 40 do not contact with the metal middle frame 30 to cause a short circuit problem.

It should be noted that, in other embodiments, the shape of the first receiving space is adapted to a profile of the antenna board 20, and the shape of the second receiving space is adapted to a profile of the main control board 40, so that after the first and second connectors 22, 42 are plug-fitted with each other, the antenna board 20 and the main control board 40 can be accommodated and fixed in the first receiving space and the second receiving space, respectively, thereby reducing the space size of the millimeter-wave radar 100 and making the overall structure more compact.

In some embodiments, the radome 10 is provided with a sealing ring 80 between the connection positions of the radome 10 and the base 50, and the sealing ring 80 is used for sealing a connection gap between the radome 10 and the base 50 to improve the waterproof performance of the millimeter-wave radar 100 so that the millimeter-wave radar 100 can operate in a wet environment such as rainy weather.

Specifically, the radome 10 comprises a first wall 12 and a second wall 13 provided around the periphery of the first wall 12, wherein the first wall 12 and the second wall 13 enclose an accommodating cavity, that is, the radome 10 is a cylindrical structure with one end having an opening and the other end being closed, such as a square cylinder, or a cylindrical cylinder, etc. The through-hole 11 is provided on the first wall 12 and communicates with the accommodating cavity, and the main control board 40, the antenna board 20 and the metal middle frame 30 are all located in the accommodating cavity. A support protrusion 52 is provided on a side of the base 50 facing the main control board 40, a side of the main control board 40 facing away from the metal middle frame 30 abuts against the support protrusion 52, the radome 10 is sleeved outside the support protrusion 52, and the sealing ring 80 is located between an outer peripheral wall of the support protrusion 52 and an inner peripheral wall of the second wall 13.

The support protrusion 52 encloses an avoidance space, so that the support protrusion 52 abuts against the edge of the side of the main control board 40 facing the base 50, so that a power consumption element provided on the side of the main control board 40 facing the base 50 can be located in the avoidance space without rigid contact with the base 50.

In some embodiments, a receptacle 14 is further provided outside the radome 10, is electrically connected to the main control board 40, and is used for electrically connecting to an external control device, i.e., the external control device is plugged into the receptacle 14 via a connector adapted to the receptacle 14, so that the external control device is electrically connected to the millimeter-wave radar 100. The receptacle 14 is provided outside the second wall 13, and the receptacle 14 and the second wall 13 are of an integral structure.

The millimeter-wave radar 100 is electrically connected to an external control device through the receptacle 14, so that data exchange and processing are performed between the external control device and the millimeter-wave radar 100, so that the external control device acquires detection data of the millimeter-wave radar 100 and performs related operations. As an example, the external control device may be a control platform inside the automobile, and the control platform of the automobile electrically connects to the millimeter-wave radar 100 and controls the automobile speed, driving route, etc. of the automobile after acquiring data such as the relative speed and distance of an object detected by the millimeter-wave radar 100, thereby realizing intelligent driving of the automobile.

In some embodiments, the radome 10 is removably coupled to the base 50 to facilitate the user to disassemble and maintain when the antenna board 20 or the main control board 40 inside the millimeter-wave radar 100 fails.

Specifically, a connection hole is provided on the base 50 and is located at the outer periphery of the support protrusion 52, a fixing hole is provided on the second wall 13 of the radome 10 at a position corresponding to the connection hole, and one end of a fixing member such as a screw passes through the connection hole and is screwed and fixed to the fixing hole, thereby screwing and fixing the base 50 and the radome 10.

Figure 5:
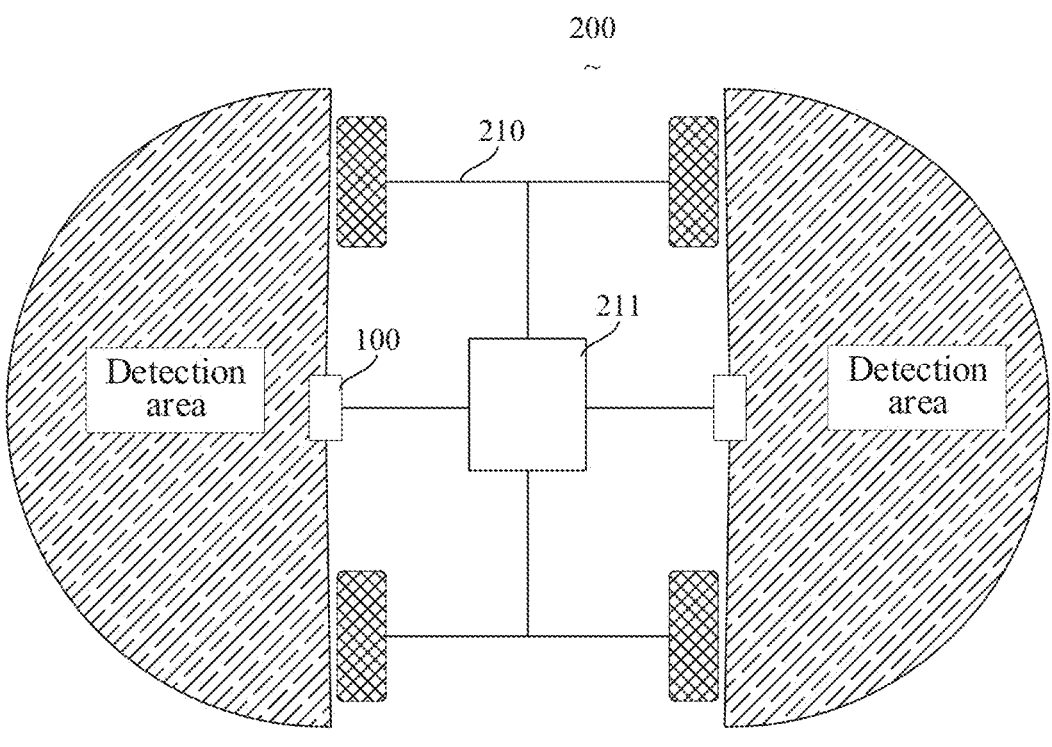
FIG. 5 shows a schematic diagram of a configuration of an automobile driving control system according to an embodiment of the present invention.

Referring to FIGS. 1 to 5. FIG. 5 is a schematic view showing a configuration of an automobile driving control system 200 according to an embodiment of the present invention. In another aspect of an embodiment of the present application, an automobile driving control system is further provided, and the automobile driving control system 200 comprises an automobile body 210, a control platform 211 built in the automobile body 210, and a millimeter-wave radar 100 according to the above embodiment, wherein the millimeter-wave radar 100 is provided on either side of the top of the automobile body 210, and the millimeter-wave radar 100 is electrically connected to the control platform 211.

The control platform 211 is a control host inside the automobile for controlling the coordinated operation between various powered devices, the number of the millimeter-wave radars 100 is at least two, and two millimeter-wave radars 100 are respectively provided on either side of the automobile body in the width direction, and as an example, one millimeter-wave radar 100 is provided on the left side of the automobile body 210, and the other millimeter-wave radar 100 is provided on the right side of the automobile body 210. The millimeter-wave radar 100 can have a larger detection angle orientation and recognition accuracy of obstacles after data fusion with the radar transceiver module 21 of the antenna board 20 via the image acquisition module 41 to ensure that the automobile has a large range of detection area in the front-rear direction of the side of the external environment, thus greatly improving the driving safety of the automobile, for example, it can greatly reduce the probability of collision with people or obstacles when the automobile turns, thus reducing traffic accidents, reducing casualties and property losses. In addition, during intelligent driving, the control platform 211 may perform corresponding actions by acquiring detection data of the millimeter-wave radar on the external environment, such as data information about the distance between the automobile and the obstacle, the size of the obstacle, the relative speed between the automobile and the obstacle, etc. such as planning a driving route, prompting the driver to slow down by voice, reducing the automobile speed, etc.

It is to be noted that, unless otherwise indicated, technical or scientific terms used in the examples of the present invention shall have the ordinary meaning as understood by a person skilled in the art to which the examples of the present invention pertain.

In describing the description of the embodiments of the present invention, the orientation or positional relationships indicated by the technical terms "inner". "outer" and the like are based on the orientation or positional relationships shown in the drawings, merely to facilitate the description of the embodiments of the present invention and simplify the description, and do not indicate or imply that the devices or elements referred to must have a particular orientation, be constructed and operated in a particular orientation, and thus should not be construed as limiting the embodiments of the present invention.

Further, the technical terms "first" and "second", etc. are used for descriptive purposes only and are not to be construed as indicating or implying relative importance or implicitly indicating the number of technical features indicated. In describing the embodiments of the present invention, the meaning of "a plurality of" is two or more, unless specifically and specifically limited otherwise. Finally, it should be noted that: the above embodiments are only used to illustrate the technical solution of the present invention, and not to limit the same; while the invention has been described in detail and with reference to the foregoing embodiments, it will be understood by a person skilled in the art that: the technical solutions described in the foregoing embodiments may still be modified, or some or all of the technical features may be equivalently replaced; and such modifications and substitutions do not depart from the spirit and scope of the embodiments of the present invention, and are intended to be included within the scope of the claims and the description. In particular, the technical features mentioned in the various embodiments can be combined in any manner as long as there is no structural conflict. The present invention is not limited to the particular embodiments disclosed, but that the invention will include all embodiments falling within the scope of the appended claims.

The invention claimed is:

1. A millimeter-wave radar, comprising a radome, an antenna board, a metal middle frame, a main control board and a base which are sequentially arranged;

wherein an image acquisition module is provided on one side of the main control board facing the radome;

the antenna board is provided with a radar transceiver control module and is electrically connected to the main control board;

the metal middle frame is provided with a notch through which the image acquisition module passes;

the radome is made of a material through which millimeter-waves can pass, the radome is connected to the base, and the main control board, the antenna board and the metal middle frame are all located in a space enclosed by the radome and the base, and the radome is provided with a through-hole which communicates with the notch, so that the image acquisition module extends outside the through-hole.

2. The millimeter-wave radar according to claim 1, wherein the radar transceiver control module is provided on a face of the antenna board facing away from the metal middle frame, and a face of the metal middle frame facing the antenna board is provided with a first thermally-conductive pad at a position corresponding to the radar transceiver control module.

3. The millimeter-wave radar according to claim 1, wherein an outer cover of the radar transceiver control module is provided with a shield for preventing electromagnetic interference between the antenna on the antenna board and the radar transceiver control module.

4. The millimeter-wave radar according to claim 3, wherein a second thermally-conductive pad is provided between the shield and the radar transceiver control module.

5. The millimeter-wave radar according to claim 1, wherein a face of the base plate facing the main control board is provided with a third thermally-conductive pad at a position corresponding to the image acquisition module.

6. The millimeter-wave radar according to claim 1, wherein the metal middle frame is further provided with a plug hole, the antenna board is provided with a first connector at a position corresponding to the plug hole, the main control board is provided with a second connector at a position corresponding to the plug hole, and at least one of the first connector and the second connector is plug-fitted with the other through the plug hole to electrically connect the main control board with the antenna board.

7. The millimeter-wave radar according to claim 6, wherein a first flange is provided around a side of the metal middle frame facing the antenna board, and a second flange is provided around a side of the metal middle frame facing the main control board;

an edge of the antenna board abuts the first flange and an edge of the main control board abuts the second flange when the first and second connectors are plug-fitted.

8. The millimeter-wave radar according to claim 1, wherein a sealing ring is provided where the radome and the base are connected.

9. The millimeter-wave radar according to claim 8, wherein the radome comprises a first wall and a second wall provided around the periphery of the first wall, the first wall and the second wall are enclosed to form an accommodating cavity, the through-hole is provided on the first wall and communicates with the accommodating cavity, and the main control board, the antenna board and the metal middle frame are all located in the accommodating cavity;

a support protrusion is provided on a face of the base facing the main control board, a face of the main control board facing away from the metal middle frame abuts against the support protrusion, the radome is sleeved outside the support protrusion, and the sealing ring is located between an outer peripheral wall of the support protrusion and an inner peripheral wall of the second wall.

10. An automobile driving control system, comprising an automobile body, a control platform built in the automobile body, and the millimeter-wave radar according to claim 1, wherein the millimeter-wave radar is provided on either side of a top of the automobile body, and the millimeter-wave radar is electrically connected to the control platform.

* * * * *